United States Patent [19]  
Woolfson et al.

[11] 4,405,940  
[45] Sep. 20, 1983

[54] APPARATUS AND METHOD FOR PREPROCESSING VIDEO FRAME SIGNALS

[75] Inventors: Martin G. Woolfson, Baltimore; John G. Romanski, Kingsville, both of Md.

[73] Assignee: Westinghouse Electric Corp., Pittsburgh, Pa.

[21] Appl. No.: 802,086

[22] Filed: May 31, 1977

[51] Int. Cl.³ ............................................ H04N 7/18
[52] U.S. Cl. ................................. 358/93; 358/105; 358/125; 358/126
[58] Field of Search .................. 358/125, 126, 93; 250/203 R, 203 CT

[56] References Cited

U.S. PATENT DOCUMENTS

| | | | |
|---|---|---|---|
| 3,829,614 | 8/1974 | Ahlbom et al. | 358/126 |
| 3,865,974 | 2/1975 | Alpers | 358/125 |
| 3,903,357 | 9/1975 | Woolfson et al. | 358/126 |

Primary Examiner—Theodore M. Blum  
Attorney, Agent, or Firm—W. E. Zitelli

[57] ABSTRACT

A video signal preprocessor for discriminating a target image from background in the video frame signals generated by an electro-optical sensor electrically representing the field of view thereof is disclosed. A predetermined portion of each video frame signal is selected and divided into a predetermined number of elements. Each element is assigned a gray level value from a plurality of discrete gray level values as a measure of video intensity. A discriminant function of gray level values is formed from the video data of an initial video frame signal based on the number of elements assigned to each discrete gray level value. Elements which have assigned gray level values corresponding to those of the formed discriminant function are then selected from the video frame signals subsequent to the initial one and may represent a substantial image of the target. Further preprocessing may be performed by categorizing the gray level values of the discriminant function into a set of discrete modes. A signal representative of the velocity of the group of elements having gray levels corresponding to each mode is generated for each mode of the set of modes. A target set of modes is identified from the set of modes based on the generated velocity signals and a predetermined velocity signal representative of the background velocity. Only elements which have assigned gray levels corresponding to the target set of modes are selected from the video frame signals to represent a target image.

24 Claims, 19 Drawing Figures

APPARATUS AND METHOD FOR PREPROCESSING VIDEO FRAME SIGNALS

GOVERNMENT CONTRACT

The invention herein described was made in the course of a government contract or subcontract thereunder with the Department of the Air Force.

BACKGROUND OF THE INVENTION

1. Field of the Invention

The invention relates to video preprocessing systems in general, and more particularly, to a video preprocessor employed for discriminating a target image from background on the basis of mass intensity contrast and relative motion using discrete gray level values as a measure of video content.

2. Description of the Prior Art

An example of a system employing a video preprocessor is a video tracking system which typically comprises a video tracker, control servo electronics, a gimballed pointing mechanism, and an electro-optical sensor. In general, the electro-optical sensor which is usually a TV camera is mounted directly to and boresighted with the gimbal mechanism and transmits electrical data in a standard video frame format corresponding to its field of view to the video tracker at a frequency on the order of 30 to 60 times a second. The video tracker may append the video frame signals to include identification cursors which may be used to define a point or an area of the video frame signal. The combined video signals are sent to a TV monitor for displaying the intensity pattern of the field of view to an operator. An operator generally may interact with the video tracker by controlling the position of the cursors on the TV screen in an attempt to define the position of the target. Once the operator has pinpointed the target or enclosed the target in an area defined by the cursors, video tracking or "lock-on" of the target may be initiated. The basic functions of a video tracker are to discriminate a target image from the background in the field of view represented by the standard video signal frame data and compute error signals based on the change in position and velocity of the potential target image. These error signals are used as command signals to the control servos which in turn control the positioning of the gimballed mechanism altering the field of view of the TV sensor in such a direction to maintain the target within a specified area in the field of view.

Normally, the video trackers employ a video preprocessor for providing target discrimination from the video frame signals which represent the field of view of the TV sensor. Some preprocessors such as that disclosed in U.S. Pat. No. 3,865,974 issued to Fredrick C. Alpers on Feb. 11, 1975, and U.S. Pat. No. 3,341,653 issued to J. R. Kruse, Jr. on Sept. 12, 1967 define a target according to the sampled gray level of a selected spot or point on the screen of the TV monitor. In both of these systems, the sampled particular gray level is declared as the potential target and tracking is performed by following the gray level spot around the field of view. No attempt is made in these systems to assign other gray level values to the target or to assign gray levels to the background and no mechanism is provided for eliminating residual background. It is evident that these type systems discriminate only a very small portion of the target image in most cases, and that there exists a high probability that "lock-up" may occur on background, if background has the same gray level as the sampled gray level declared as the target. Alpers further includes a time dependent coordinate function as an additional measurement dimension in discriminating the target. However, since no mechanism is provided for eliminating residual background gray levels, then the tracking system may still "lock-on" to a gray level of the background which falls in close proximity to the time dependent coordinate of the gray level spot declared on the target.

Other preprocessors, such as those disclosed in U.S. Pat. No. 3,562,423 issued to Murphy on Feb. 9, 1971; U.S. Pat. No. 3,586,770 issued to Bonebreak et al on June 22, 1971; and U.S. Pat. No. 3,829,614 issued to Ahlbom et al on Aug. 13, 1974, declare a target based on a band of gray levels selected from the intensity pattern of the field of view of the sensor. Murphy, for example, has adjustable upper and lower gray level values which define a band of gray levels. The preprocessor, in this case, then declares a target by gating only those video signals within a field of regard which have gray levels falling within the defined band of gray levels. Bonebreak also identifies a potential target as those gray levels within a field of regard which fall within an adjustable gray level band. In this system, an operator interacts with the preprocessor to pinpoint a target on the TV screen as the crosspoint of coordinate cursors. The preprocessor searches in a small surrounding region about the crosspoint for the lowest and highest gray levels and assigns those gray levels falling therebetween to a target set. Ahlbom et al teaches still another preprocessor which identifies a target based on a band of gray levels. This preprocessor computes an average gray level value which is used to center the gray level band and to adaptively set upper and lower gray level quantity limits based on feedback correlation information.

All of these type preprocessor systems, in identifying a target image based on a band of gray levels, may also include as the target portions of the background which have gray levels based on the same gray level band. There is no reason to believe, except in an exceptional case, that only the target has these gray levels defined by the gray level band. There are no provisions made for discriminating a target set from a background set based on disjoint set of gray levels, nor is there provided any mechanism for eliminating residual background. In Murphy, the operator must make the decisions of where to set the upper and lower levels of the gray level bands and once set, these remain fixed.

Another preprocessor, such as that disclosed by Jonsson in U.S. Pat. No. 3,745,244 issued July 10, 1973, segregates a portion of the field of view of the sensor into inner and outer windows enclosing a predetermined target image. The average gray level value of the outer window is computed and is representative as the mean intensity of the background. Light and dark intensities relative to the mean intensity are identified in the inner target window and the gray level intensity which has the largest area is declared the target and submitted to the video tracker for tracking purposes. It is understood that during the averaging process, it is possible to lose quite a bit of information of the intensity pattern structure of the field of view. Pieces of the target may occur in the background and vice versa, thus the computed mean is not considered the best statistic for discriminating target images. In order for this type of preprocessor to function effectively, the target image must have a dominant contrast with the background or the background requires some structure. Otherwise, it is possible to just discriminate background and not the target at all or just select small regions of the target. This type preprocessor appears to guarantee target image discrimination only for the simple condition in which the target is contrasted on a uniform background.

Still another preprocessor is disclosed in U.S. Pat. No. 3,903,357 by Woolfson et al issued Sept. 2, 1975. This preprocessor identifies a target by a number of track windows which define the center and outer edges of a potential target by basically considering contrasting edges of gray level intensity patterns. As is the case in the Woolfson preprocessor described here and in some of the other preprocessors described above which are all essentially based on computing averages, the assumption is made that the intensity pattern of the field of view does not change dynamically. Thus, conditions which create the intensity gray levels which define the sizes and shapes of the images in the field of view are assumed to vary slowly compared to the frequency at which computations are made. This may be fine for some applications, but when dealing with a highly dynamic environment like trying to capture a missle or higg velocity aircraft in flight, the changes in target image are very frequent and very extensive and dramatic. These systems which require accumulation of data and averaging to make decisions normally cannot respond functionally to rapidly changing intensity pattern conditions. In some instances, it is possible that a target contrast image will flip instantaneously. Most systems usually "lock-on" to background when a target goes through an instant contrast change. It appears that in order for these systems to function effectively the intensity pattern of the field of view may not change faster than the time required to make data computations.

In addition, these preprocessors which have been briefly described above mainly function to interface with simple video centroidal trackers which normally define tracking errors based on effective areas of gray level signals which cross a threshold in a predetermined region. The centroidal type tracker generally functions on a pure black and white pattern and is unable to function with gray level image patterns because of a normalization constant which it is unable to derive easily or effectively with the tracking method it uses. Thus, the preprocessor employed thereby is required to convert everything into a black and white image which is normalized based on the area of a track window. These preprocessors are not required to derive amplitude structure of the image which they declare as the target, so they derive patterns which have no amplitude structure, that is patterns based on either a one or a zero.

Other preprocessers, such as those which are employed by a digital correlation type video tracker, need more precision in defining a target image. A preprocessor suitable for this purpose must preserve more of the character of the image than just a binary 0 and 1. The present invention is believed to provide a precise definition of a target image suitable for use in a digital correlation tracker and equivalent system plus provide an additional dimension of measurement for target discrimination not believed found in the present video tracking systems.

SUMMARY OF THE INVENTION

In accordance with the present invention, a video preprocessor may be incorporated in a conventional video tracking system comprising a video tracker, servo control electronics, a gimballed pointing mechanism and an electro-optical sensor coupled to the gimballed mechanism. The preprocessor discriminates a target image from the video content of video frame signals, generated sequentially by the electro-optical sensor. A predetermined portion of video signal selected from each video frame signal is divided into a predetermined number of elements wherein each element is indexed in accordance with its time dependent position within the predetermined portion. Each element is assigned a gray level value from a plurality of gray level values as a measure of the video content thereof.

The preprocessor cooperates with the tracking system to segregate the elements of a selected video frame signal into inner and outer portions with respect to their time dependent position indexes. The preprocessor classifies the elements of the inner and outer portions as a function of their assigned gray level values and further, generates a discriminant function of gray level values based on the gray level classifications of the inner and outer portions. Thereafter, the preprocessor may select from the selected predetermined portion of the video signals of each video frame signal only those elements having assigned gray levels corresponding to that of the discriminant function generated from the selected video frame signal and may replace the video content of the selected predetermined portion of the video signal of each video frame signal with only the video content of the elements selected therefrom corresponding to the indexed position thereof. The composition of the selected elements may represent a substantial image of the target at times when the target has a distinguishable mass intensity contrast with the background.

The preprocessor additionally may refine the target discrimination by including the relative velocity of potential targets as another measurement dimension to complement that of mass intensity contrast. Accordingly, portions of the spectrum of gray level values of the discriminant function are categorized into modes by the preprocessor. Elements corresponding to these modes may be selected from the predetermined portion of video signal of each video frame signal by the preprocessor. The video tracker using conventional image comparison correlation methods utilizes the images formed by the elements of each mode to generate a signal representative of the velocity of each mode. The preprocessor, in turn, selects at least one mode as representative of a target set of modes from the predetermined portion of video signal of each video frame signal based on a relationship of the generated velocity signal of the selected mode with respect to a predetermined velocity signal and the velocity signals of the other modes. Further, the preprocessor replaces the video content of the selected predetermined portion of the video signal of each video frame signal with only the video content of the elements of the at least one mode selected therefrom corresponding to the indexed position thereof. The composition of the elements of the at least one selected mode represents an image of at least a portion of the target within the predetermined portion of the video signal of each video frame signal.

DESCRIPTION OF THE PREFERRED EMBODIMENT

Environment

Figure 1:
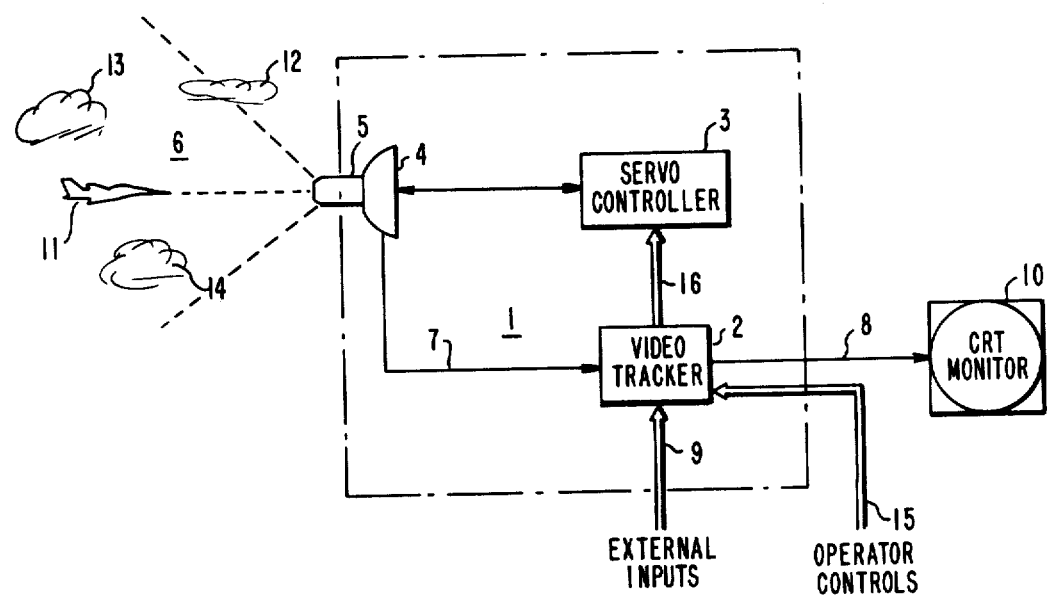
FIG. 1 is a functional block diagram of a typical video tracking system incorporating the present invention.

Referring to FIG. 1, a typical video tracking system 1 incorporating the present invention nominally comprises a video tracker 2, servo control electronics 3, a gimballed pointing mechanism 4 and an electro-optical sensor, such as a television camera, 5 mechanically coupled to the gimbal 4. The sensor 5 is usually directly mounted on the gimbal 4 to be boresighted therewith. A video frame signal representative of a field of view 6 of the sensor 5 is normally electrically transmitted therefrom over line 7 in a standard 525 line or 625 line video format to the video tracker 2 at rates at typically 60 times a second. A set of cursors defining a track window are added to each video frame signal by the video tracker 2 and each composite video frame signal is transmitted over signal line 8 to a device such as a cathode ray tube monitor 10 for display thereby. Examples of that which may be viewed by the sensor 5 and displayed by the monitor 10 are shown in FIGS. 1A and 1B.

Figure 1A:
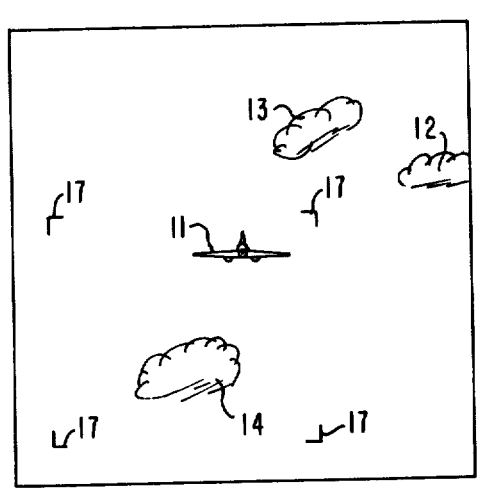
FIGS. 1A and 1B illustrate a simplified display of a CRT monitor used in connection with the video tracking system of FIG. 1.
Figure 1B:
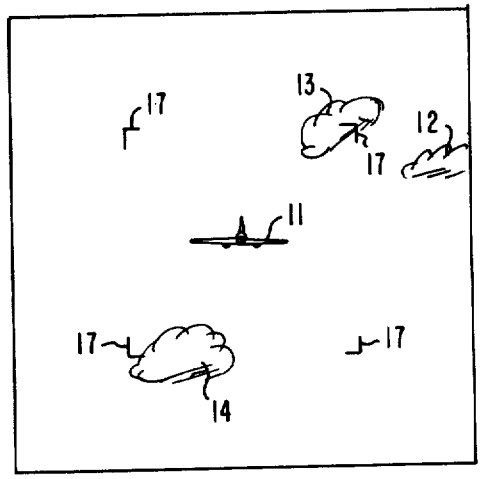

In operation, an operator generally interacts with the video tracking system 1 by manually aligning the sensor 5 to bring the target of interest, such as an airplane 11 shown in FIG. 1, into the field of view 6 of the sensor 5 as shown in FIG. 1A. To accomplish this, manual position control signals are coupled to the video tracker 2 from an operator over signal lines 15. The video tracker 2 responds by presenting position or velocity related signals 16 to the servo controller 3 which in turn responds to control the the position of the gimbals 4 and sensor 5 mounted thereon to the position desired by the operator. Background clutter such as clouds 12, 13 and 14 may also appear as potential targets in the field of view 6 of the sensor 5. The operator may next wish to centrally locate the target in the track window defined by cursors 17 as shown in FIG. 1B by controlling the position of the track window on the screen of the monitor 5 using a device such as a joy stick (not shown in FIG. 1) wherein the output signals of the joy stick are coupled to the video tracker 2 over signal lines 15.

Once the desired target 11 is within the track window, the operator may transmit a track signal to the video tracker over lines 15 which commands the video tracking system 1 to control the boresight position of the gimbal 4 to direct the line of sight of the sensor 5 so that the desired target 11 is maintained within the field of view 6 and, preferably within a selected predetermined portion of the video frame signals defined by the cursors 17 of the track window.

A preprocessor (not shown in FIG. 1) is incorporated into the video tracker 2 and operates during the target tracking operation described above to preprocess the incoming video frame signals to enhance the rejection of background clutter such as the clouds 12, 13 and 14 which may interfere with target tracking. It discriminates the target such as the airplane 11 against the background on the basis of mass intensity contrast. And, if required, the video preprocessor additionally may accept external inputs, such as signals representative of background velocity, over signal lines 9 to further discriminate the target based on relative motion. The video tracker 2 utilizes the preprocessor to derive position error signals of the desired target relative to the gimbal boresight; the error signals 16 are coupled to the servo control electronics 3 which in turn causes the pointing mechanism 4 to move in a direction so as to null these errors. For a more detailed description of a Digital Correlation Tracker, reference is made to Report No. AFWL TR-74-170, prepared for the Air Force Weapons Laboratory; Air Force Systems Command, Kirtland Air Force Base, New Mexico, which is unclassified.

Theory of Operation

A theory of operation is provided at this point for a more detailed understanding of the invention. Generally, the selected predetermined portion of the video frame signals defined by the cursors 17 of the track window is divided into a 32×32 array of video picture elements known more commonly as pixels. The elements of the track window may be further divided into an inner and outer portion, the inner portion being a reference window comprised of a 16×16 array of pixels usually centrally located with the track window and the outer portion being comprised of those elements which are positioned outside the reference window. Intensity mass functions in the form of histograms are constructed from the video content data appearing within the inner and outer portions of the track window. The following heuristics were found suitable for this embodiment to develop first level logical decisions in connection with the theory of operation of the preprocessor and video tracker.

(1) If the target is said to exhibit a contrast relative to the background, then the intensity mass function of the target differs from that of the background.

(2) If the windows are properly located within the field of view of the sensor, more of the target will appear in the inner portion than in the outer portion of the track window. It is understood that this notion does not form a processing constraint but does aid in a sequential discrimination process which may separate and classify gray level subsets formed from the video intensity data which will be described in detail hereinbelow.

(3) Background data is stationary such that moving background images are in a one to one correlation with the motion of the sensor.

The video content or intensity of each pixel is usually measured in a gray level wherein each element of the track window may be assigned an integer gray level value from a predetermined integer number (denoted by m) of gray level values. A spectrum divided into 128 gray level values was found suitable in this embodiment for discriminating the target from background, but it is understood that the span of gray level needed to measure the video intensity may be divided into as many gray level values as is necessary to satisfy contrast and resolution requirements. For the purposes of describing the theory of operation, the track window is defined by the matrix P of integer gray level values such that:

$$0 \leq P_{ij} \leq m; i,j = 1, \ldots, 32 \tag{1}$$

where i,j denote the time dependent position index coordinates of the pixels in the track window.

The inner (I) and outer (O) portions or window sets of the track window are defined as follows:

$$I = \{(i,j) \mid 9 \leq i \leq 24; 9 \leq j \leq 24\} \tag{2}$$

$$O = \{(i,j) \mid 1 \leq i,j \leq 32 \text{ and } (i,j) \notin I\} \tag{3}$$

Gray level mass functions GI, inner mass function, and GO, outer mass function, of dimension m+1 are formed as follows: Let $$Q_{ij}^k = \begin{cases} 1 \text{ if } P_{ij} = k \\ 0 \text{ otherwise} \end{cases} \tag{4}$$

$$GI_k = \sum_{i,j \in I} Q_{ij}^k \tag{5}$$

$$GO_k = \sum_{i,j \in O} Q_{ij}^k \tag{6}$$

where k=0, 1, ..., m and denotes each integer gray level value of the m possible gray level values.

Thus, the inner and outer mass function of Equations (5) and (6), respectively, may be considered histograms where the abscissa is indexed in consecutive gray level integer values and the ordinate is a measure of the number of elements in each integer gray level value, k.

Further, a positive difference function, C, of dimension m+1 is defined according to the following:

$$C_k = \begin{cases} GI_k - GO_k \text{ if } GI_k > GO_k + T \\ 0 \text{ otherwise} \end{cases} \tag{7}$$

where T is a threshold value normally associated with electrical noise.

The function $C_k$ defines those elements of the gray level value k such that more elements appear in the inner window than in the outer window beyond a threshold noise value, T. It is noted that for a uniform intensity structure through both windows, C is the null vector. The positive difference function C may be used as a discriminant function for the purposes of this embodiment. Generally, this discriminant function is generated for an initial video frame signal when the video tracking system 1 enters the track mode and possibly for a frame of data before the tracker updates. After the discriminant function is generated, it is normally stored in a convenient memory and serves as a basis for preprocessing subsequent video frame signals during the track mode. Thus, for each video frame signal during tracking, the preprocessor maintains the gray level values of only those pixels in the track window which have gray level values equivalent to those having a positive difference value in the discriminant function of equation (7) above and zeros the gray level value for all other pixels in the track window. A more detailed description of the preprocessor system is provided herebelow.

If the target does not exhibit sufficient intensity mass contrast relative to the background, then the video tracking system is incapable of "locking on" to the target even after preprocessing the video intensity data with the preprocessor as described above. Another dimension of measurement such as relative motion may be required to further define the preprocessing operation to discriminate the target from the background assuming the target is moving relative to the background as stated above in heuristic (3).

Portions of the spectrum of integer gray level values of the discriminant function of equation (7) above may be categorized into modes or disjoint gray level subset vectors $M^i$ of dimension m+1 which are defined as follows:

$$M_j^i = \{C_j \mid C_{k-1} = 0; C_{k+n+1} = 0; C_j > 0, k \leq j \leq k + n\} \tag{8}$$

$$M_j^i = \{0\}; j \notin [k, k+n] \tag{9}$$

where each i denotes an interval [k,k+n]. By construction, then $$M^i \perp M^j, i \neq j \tag{10}$$

and $$C = \sum_i M^i \tag{11}$$

The modes $M^i$ denoted by equations (8) and (9) categorize groups of adjacent consecutive gray level values which have no zero positive difference value. The modes $M^i$ are thus separated by one or more adjacent consecutive gray level values which do have zero positive difference values. Equation (10) indicates that, by construction, the categorized modes $M^i$ are all orthogonal. And also, by construction, the summation of the mass of elements in all the i modes is equal to the summation C of all the elements of the gray level mass intensities, $C_k$ of the discriminant function of equation (7) above. Thus, there exists a one to one mapping correspondence of pixels between the gray level mass intensities, $C_k$, and the modes $M^i$.

A measure of each mode, $M^i$ may be accomplished by computing the number of elements in that set or:

$$a_i = m(M^i) = \sum_j M_j^i \tag{12}$$

where m is an operator operating on the modes, $M^i$, and for the purposes of this embodiment may be a summation operator summing all the elements having the gray level values of mode, $M^i$; and $a_i$ is the value of the number of elements in the mode, $M^i$.

The modes, $M^i$, are ranked to permit the preprocessor to function in an orderly fashion, the rankings may be as follows:

$$a_{i+1} \geq a_i, i = 1, \ldots, L \qquad (13)$$

It may also be assumed that there exists two disjoint sets B and T in the track window, where B is the background and T is the target. There may also exist two disjoint index sets $I_1$ and $I_2$ such that:

$$M^iCB \text{ if } i\epsilon I_1 \qquad (14)$$

and $$M^iCT \text{ if } i\epsilon I_2$$

Thus, the elements having those gray level values associated with mode $M^i$ may be included in the background B, if it is determined that the index i is an element of the index set $I_1$; and likewise, the elements having those gray level values associated with $M^i$ may be included in the target set, T, if it is determined that the index i is an element of the index set $I_2$.

The object of the preprocessor in cooperation with the video tracker is to discover the set T and thereby define the target. This process may be performed sequentially by the preprocessor in two main modes—Acquisition and Enhancement. In the acquisition mode, the objective is to identify a target subset or mode. In the enhancement mode, subsequent subsets or modes are appended to the identified target subset and background subsets are discarded. The preprocessor may operate on two subsets at a time, such as during each video frame signal generation, employing one subset in an active mode and one in a passive mode wherein a tracker may be associated with each or a common tracker may be time shared such that when operating to track the subset employed in the active mode, it is the active mode tracker; and likewise, when operating to track the subset employed in the passive mode, it is the passive mode tracker. The active mode tracker is employed to control the position of the electro-optical sensor 5 as described in connection with FIG. 1 and the passive mode tracker is employed to follow relative motions within the field of view 6 of the sensor 5.

The preprocessor may start with two modes of the highest rank with the higher ranked mode in the active role. Discrimination is based on signals representative of the relative velocities of the modes generated from the discriminant function which are usually measured by conventional digital correlation tracking techniques carried out by the video tracker. Decision rules which may exist according to the preferred embodiment are as follows:

Acquisition Mode

If it is determined that a mode employed in the passive mode tracker has a velocity indication and that velocity indication approximates a predetermined or predicted value associated with the background velocity usually obtained from a conventional inertial navigation system or an equivalent thereof, then it is determined that the mode employed in the passive mode tracker belongs to the background set; otherwise, the mode belongs to the target set and is switched to the active mode tracker. It is noted that when no moving target is found, then the initial target is replicated.

Enhancement Mode

If the velocity indication of the mode employed in the passive mode tracker approximates that velocity of the mode employed in the active mode tracker, then the target set employed in the active mode tracker is appended to include that of the passive mode; otherwise, the passive mode subset belongs to the background set. The next highest ranked subset is then employed by the passive mode tracker and the enhancement mode is repeated until all of the modes generated from the discriminant function are exhausted.

Upon completion of the enhancement mode, a target set, T, of gray levels is established. From the track window of each subsequent video frame signal, only those pixels having the gray values associated with the target set, T, are selected. These pixels, which are selected from each video frame signal and which constitute an intensity pattern image of the desired target, are used to replace the video content of the track window of each video frame signal from which they were selected. Thus, the video tracking system may track a desired target image which has been preprocessed in accordance with both a gray level contrast and relative motion or velocity. Further description will be provided herebelow in connection with system operation.

System Description

Figure 2:
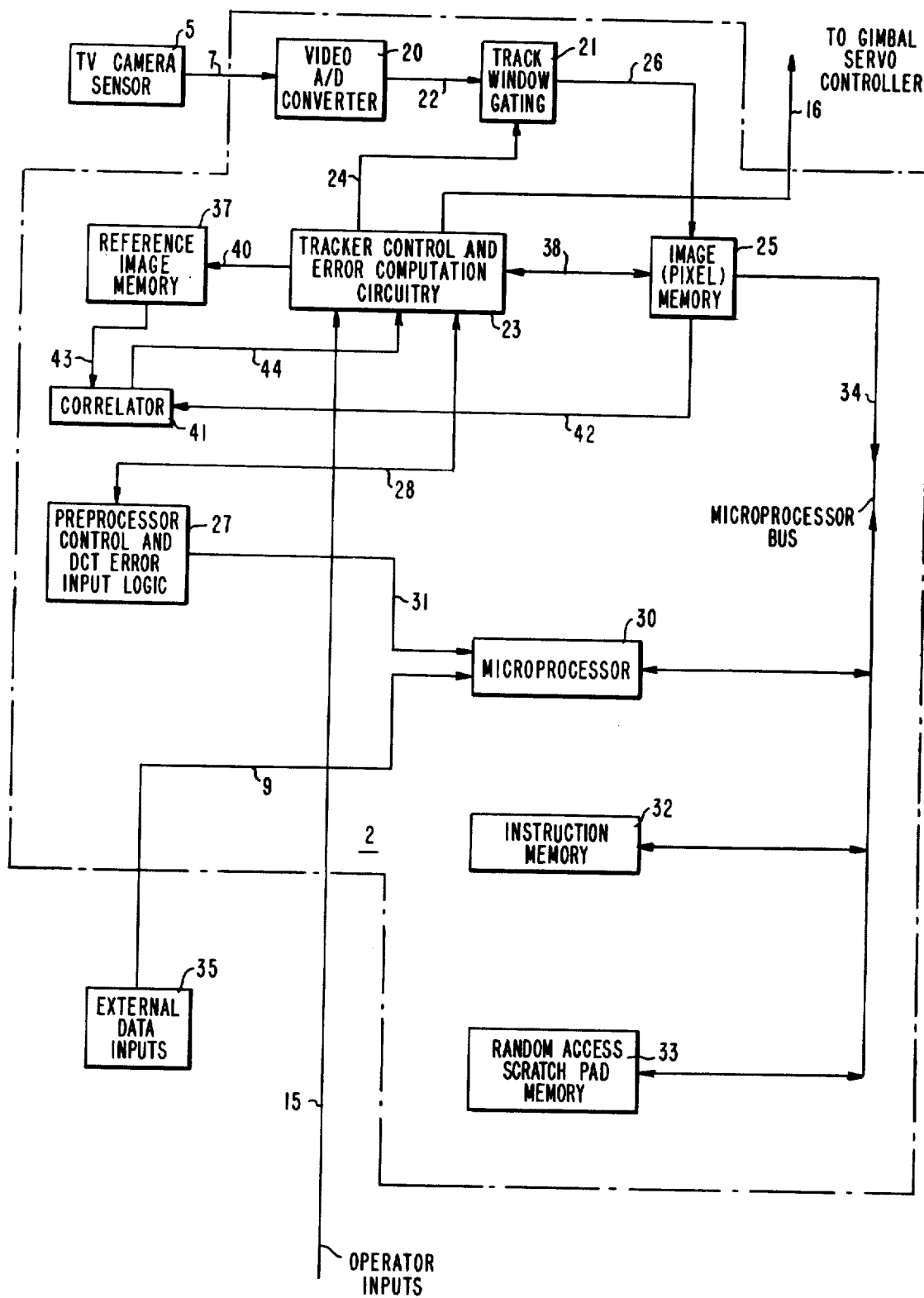
FIG. 2 is a detailed functional block diagram schematic of a video tracker employing a video preprocessor suitable for use in the video tracking system of FIG. 1.

The video tracker 2 is presented in more detail in FIG. 2. The TV camera sensor 5 transmits its field of view data electrically over signal path 7 at a suitable video frame signal rate of approximately 60 times a second. Video frame signals are normally comprised of an odd field of horizontal lines and an even field of horizontal lines which standardly total 525 or 625 lines. It is preferred for the purposes of the present embodiment to use only the video data in the odd field of horizontal lines, however the even field or both may just as well have been used to achieve the same end result. A conventional A/D converter 20 may operate continuously to digitize the incoming analog video frame signals over signal path 7. The rate at which the A/D converter 20 digitizes may be selected such that the digitized signal represents the intensity of the video content for a square area of illumination in the field of view of the TV camera sensor 5. For example, for a 525 line video frame signal of which only the odd field of approximately 245 lines are considered, the rate at which the A/D converter 20 digitizes would be 245 times a horizontal line of video intensity data thereby implicitly creating a 245×245 array of picture elements or pixels each 1/60 of a second. For this embodiment, the A/D converter 20 was selected to digitize the intensity video content into 7-bit binary number which constitute 128 gray level values. Thus, each pixel is assigned a gray level value (denoted by a 7-bit binary number) from an intensity spectrum divided into 128 gray level values in accordance with its time dependent indexed position in the 260×260 array of pixels which represent the video content of each video frame signal. This gray level intensity data is transmitted to a conventional track window gating function 21 over signal path 22.

The operator inputs the desired position of the track window, defined by the cursors 17 as shown in FIGS. 1A and 1B, to a conventional tracker control and error computation circuit 23 over signal lines 15. This information is provided to the gating function 21 over line 24. The gating function 21, in turn, responds by permitting only those digitized pixels which have a time dependent index position within the selected predetermined portion of each video frame signal defined by the track window to be stored in an image memory 25 using signal path 26. The video content of the track window is usually represented by a 32×32 array of pixels. The image memory 25 may be of the size of 32×32 words wherein each word is 7 bits and is representative of the gray level value corresponding to a position indexed pixel in the track window. The image memory may be refreshed in time during the track window portion of each video frame signal generated by the TV camera sensor 5.

Figure 3:
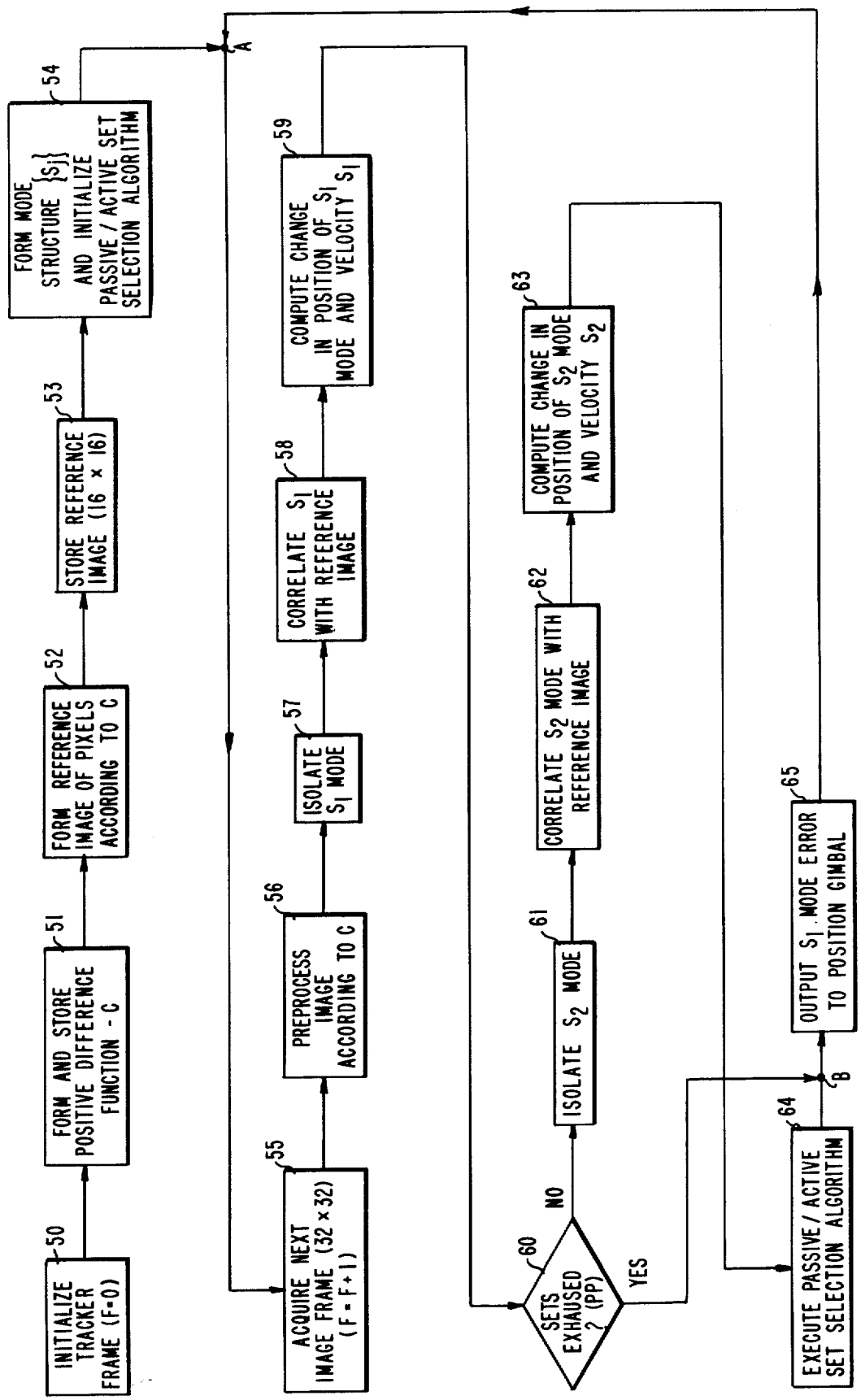
FIG. 3 is a functional flow chart depicting the sequence of operations performed by the video tracker of FIG. 2 and preprocessor employed therein.
Figure 4:
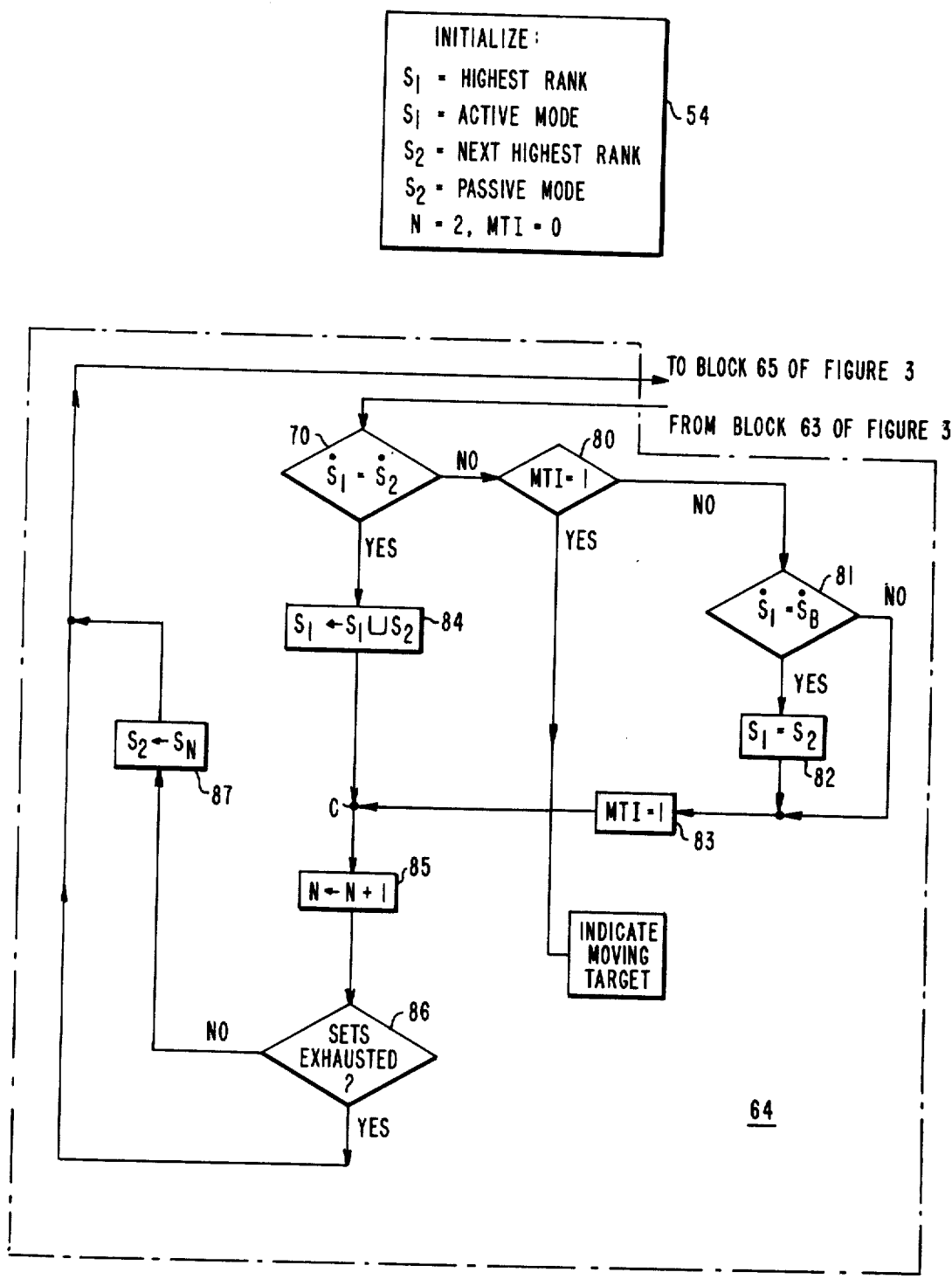
FIG. 4 is a functional flow chart of a passive/active set selection algorithm based on target motion suitable for use by the video preprocessor of FIG. 2.

When a track signal occurs over signal lines 15, the tracker control unit 23 provides a signal to a preprocessor control unit 27 over signal path 28 to initiate preprocessing of the video content of the track window of the initial video frame signal. The preprocessor control 27 activates the microprocessor 30, typically a Texas Instrument TMS 9900, over signal path 31 to start executing instructions contained in the instruction memory 32, typically comprising medium scale integrated circuits manufactured by Texas Instruments, Model No. 74S472 and totaling approximately 1024-16 bit words. The flow chart of the program contained in memory 32 executed by the microprocessor 30 is shown in FIGS. 3 and 4 and will be described in detail herebelow. The microprocessor 30 according to its preprogrammed instructions operates on the video content of the track window of the initial video frame signal subsequent to the occurrence of the track signal, to form the discriminant function based on the gray level values of the pixels instantaneously contained in the image memory 25. Temporary variables resulting from the microprocessor operations are stored in a random access scratchpad memory 33, which may be approximately 512-16 bit words and may be comprised of integrated circuits of the type having a Model No. TMS 4042-2. All addressing, data and central information exchanged between the microprocessor 30, image memory 25, instruction memory 32 and scratchpad memory 33 may be conducted over a microprocessor bus 34 which may be of the type interfaceably compatible with the TMS 9900 microprocessor. External inputs 35, such as signals representative of the background velocity conventionally derived from an inertial navigation system or equivalent system for example, are coupled to the microprocessor 30 over signal path 9.

The microprocessor 30 selects from the image memory 25 containing the initial track window frame video data only those pixels which have gray level values corresponding to the gray level values of the discriminant function having positive difference values (refer to equation (7) above). Accordingly, the microprocessor 30 replaces only the gray level values of the selected pixels in the image memory 25 corresponding to their time dependent position index and zeros the gray level of all the other pixels therein. Consequently, the inner reference portion of the image memory 25 contains preprocessed video data generated from the preprocessed video data generated from the initial track frame which is stored in a reference image memory 37 typically a 16×16 array of 7-bit words. The storage transfer of the reference image array is conventionally controlled by the tracker control 23 using signal paths 38 and 40. If imagery conditions prevail such that adequate mass intensity contrast exists between target and background, then the reference image will contain a pattern of gray levels providing a substantial image of the target.

The video content of the track window of the next video frame signal is stored similarly in the image memory 25. The video content is preprocessed using the discriminant function derived from the initial video frame. For example, only those pixels instantaneously contained in the image memory 25 containing gray level values corresponding to those of the pre-calculated discriminant function will be maintained therein and the gray level values of all other pixels will be zeroed. This operation is coordinated by the microprocessor 30 in conjunction with the programmed instructions of memory 32 which will be described in flow chart form herebelow. The resulting preprocessed image of memory 25 of the instant video frame signal is conducted to a digital correlation 41 over signal path 42 under the control of the tracker control unit 23 using signal path 38. The digital correlator 41 conventionally processes the instant preprocessed image of memory 25 with the reference image of memory 37 conducted thereto over signal path 43. Generally, correlation numbers are generated by the correlator 41 corresponding to each of the possible combinations of the 16×16 sub-images of the reference image within the 32×32 instant image of memory 25. These correlation numbers are conducted to the tracker control unit 23 over signal path 44. The tracker control unit 23 conventionally identifies a new target position based on the smallest of these correlation numbers and computes a position or velocity error signal which is conducted to the gimbal servo controller over signal path 16 for purposes of tracking the target. It is understood that the operation of a digital correlation tracker is much more complicated than that described above. However, the simplified description above is felt adequate to all those of average skill in this art area for providing an understanding of the cooperation and coordination of the present invention with a conventional video tracking system.

Once an error has been computed by the tracker control unit 23 and the video content of the track window of the next video frame signal is stored in the memory 25, an indication is provided to the preprocessor control unit 27 over signal path 28 to initiate preprocessing of the instant data of memory 25 by the microprocessor preprocessor system in accordance with the precalculated discriminant function. The tasks of the preprocessor system as described above are sequentially repeated for each subsequent video frame signal during a tracing operation based on the precalculated discriminant function. The discriminant function may be recomputed during a tracking operation at times when an update is requested by the video tracker control unit 23, for example.

In those cases in which the target mass intensity contrast within the track window is insufficient to individually permit tracking of the target, then another dimension of measurement, namely that of relative motion of the target, may be computed to further define the target discrimination of the preprocessor. Referring to FIG. 3, a simplified flow chart depicts the programming of the microprocessor system comprising elements 30, 32, 33 and 34 which have been described in connection with FIG. 2 above and additionally depicts the sequential interaction between the conventional digital correlation tracker and preprocessor shown functionally in FIG. 2. Beginning, block 50 initializes the elements of the video tracker 2 upon reception of a track signal from the operator over signal line 15 such to identify the next video frame signal as being the initial video frame signal for purposes of tracking. Block 51 forms and stores the positive difference function from the video content of the track window of the initial frame signal which is acquired in the image memory 25 in a similar manner to that described and said positive difference function is used as the discriminant function for further preprocessing. The next block 52, in sequence, forms the reference image of pixels in accordance with the gray level values of the positive difference function and stores the reference image in memory 37 as a result of processing block 53. The microprocessor 30 further categorizes the gray level values of the discriminant function into a number of disjoint gray level subsets ($S_j$) or modes (see equations (8) through (10) above) which are generally indexed and stored in the scratchpad memory 33 of the microprocessor 30 as a result of processing the instructions associated with block 54. Each mode ($S_j$) may be ranked in accordance with the total number of pixels grouped therein, wherein the group having the largest mass, for example, will have the lowest index number ($S_1$) and is, for the purposes of this embodiment, processed first in order. Processing the instructions of block 54 further controls the microprocessor 30 to initialize a passive/active set selection algorithm comprising the flow chart functional blocks of FIG. 4. The video content of the track window of the next video frame signal is acquired by the image memory 25 and has an index denoted by $F = F + 1$ in block 55 of FIG. 3. The contents of the image memory 25 are preprocessed by the microprocessor system according to the instructions of block 56 such to select only those pixels having gray level values corresponding to those associated with positive differences in the discriminant function formed from the initial video frame signal. Next, the microprocessor 30 in executing the instructions of block 57 isolates those pixels corresponding to the gray level values associated with the lowest index mode ($S_1$) and replaces the contents of the image memory 25 with only the video content of the isolated pixels corresponding to their position index. Block 58 depicts the operation in the flow chart wherein the $S_1$ mode image instantaneously stored in the image memory 25 is correlated with the reference image of memory 27 utilizing the correlator 41. Correlation numbers resulting from the operation are conducted over signal path 44 to the tracker control 23. The change in position of the $S_1$ mode is computed by the tracker control unit 23; and, with the additional knowledge of the video frame rate (typically 60 times a second), the tracker control unit 23 may further conventionally compute the velocity of the $S_1$ mode. These operations are depicted by block 59 in the flow chart of FIG. 3.

Decisional block 60 determines if the number of modes, $S_j$, is exhausted. At this time during the sequence (i.e. the first time through), if there are no modes other than $S_1$, execution will continue at point B of the flow chart. Otherwise, the instructions of functional block 61 are executed by the microprocessor 30 to isolate only those pixels having gray level values associated with the $S_2$ mode and again to replace the contents of the image memory 25 with only the video content of the isolated pixels of the $S_2$ mode corresponding to their position index. Next, block 62 depicts the operation in the flow chart wherein the $S_2$ mode image instantaneously stored in the image memory 25 is correlated with the reference image of memory 37 utilizing the correlator 41. The change in position of the $S_2$ mode is conventionally computed by the tracker control unit 23 from the resulting correlation numbers attained from the correlator 41 and, in turn, the velocity of the $S_2$ mode is derived from the position change information. These operations are depicted in the flow chart by a functional block 63. The velocity values of subsets $S_1$ and $S_2$ may be conducted to the microprocessor 30 via signal path 28, preprocessor control 27 and signal line 31.

The microprocessor operation continues with the execution of the instructions of functional block 64 which are more fully detailed in FIG. 4. Decisional block 20 of FIG. 4 compares the velocities of subsets $S_1$ and $S_2$. If they are not substantially equal, within error limitations for example, processing continues at functional block 80. Functional block 80 determines if a moving target indication (MTI) flag has been set by the microprocessor 30. Since this is the first time through the sequence and the MTI flag has been initialed to zero by block 54, the processing continues at block 81 wherein the velocity of the active mode $S_1$ is compared with a signal representative of the velocity of the background $\dot{S}_B$. The signal $\dot{S}_B$ is normally derived from the inertial navigation system or equivalent system and is transmitted as data inputs to the microprocessor 30 similar to the conventional manner shown in FIG. 2. If the $S_1$ mode has a velocity substantially equal to the background velocity signal, $\dot{S}_B$, the gray levels of the $S_2$ modes are denoted by $S_1$ (i.e. $S_2$ now becomes the active mode and is used for purposes of tracking) and the gray levels of the $S_1$ mode are generally discarded using functional block 82. Otherwise, no exchange takes place and the gray levels of the $S_2$ subset are considered in the background set and are generally discarded. The MTI flag is set true in block 83 and processing continues at point C in the flow chart of FIG. 4.

The functional blocks 80 through 83 are part of the acquisition process of the preprocessor in that they establish which of the two initial modes $S_1$ and $S_2$ of the video frame indexed $F_1$ is the target mode based on a signal representative of the background velocity derived independently of the preprocessor. It is understood that a difference in velocity between the $S_1$ and $S_2$ modes is initially established by block 70 to allow deviation of the instruction processing by the microprocessor 30 to block 80. If $\dot{S}_1$ and $\dot{S}_2$ are substantially equal, then mode $S_1$ is appended to include the gray levels of the mode $S_2$ and the combination of gray levels is denoted as $S_1$ by the functional block 84. The mode index is incremented by one in the block 85 such that the next consecutive subset may be compared for the next video frame. Decision block 86 tests if the number of subsets is exhausted. If yes, processing continues at block 65 of FIG. 3; otherwise, the gray levels of the mode $S_N$ are denoted by $S_2$ in functional block 87 and the processing continues at block 65 of FIG. 3. Block 65 depicts the operation of the tracker control 23 in providing a $S_1$ mode error to position the gimbal using signal path 16 shown in FIG. 2.

Normally, the preprocessor sequentially performs the functions depicted from point A of the flow chart shown in FIG. 3 to functional block 65 of the same flow chart for each video frame signal during a tracking operation. This preprocessing may be performed in parallel with the video signal generation of the sensor 5 and video signal digitization of the A/D converter 20 shown in FIG. 2; and in general, is performed between the time when the image memory 25 has just been filled with the video content of the track window of the instant video frame signal and the time when the video content of the track window of the next video frame signal is to fill the image memory 25. This is usually defined in time by the interval between the final time dependent cursor position index of the track window of the instant video frame signal to the initial time dependent cursor position index of the track window of the next video frame signal.

In each subsequent video frame signal until the subsets $S_j$ are exhausted, the functional blocks 55 through 65 are processed to further append to the target mode $S_1$ those gray levels associated with modes having a velocity substantially equal to the identified target mode $S_1$. This part of the processing may be considered the enhancement process of the preprocessor in that subsequent subsets or modes are appended to the identified target subset $S_1$ and the background subsets are generally discarded. It is further understood that if no moving target is found by decisional block 70 of FIG. 4, then the initial intensity pattern is replicated. Once the subsets are exhausted, and the gray levels associated with the identified target image are appended to the $S_1$ mode, then the processing will branch at functional block 60 to functional block 65 for all subsequent video frame data. Consequently, only those pixels having gray levels corresponding to the gray levels of the identified target set $S_1$ will be replaced in the track window video content of the image memory 25 and will be used by the video tracker 2 to compute the mode error which is conducted to the gimbal servo controller for purposes of tracking the target image.

Simulated Examples of Operation

This section describes a computer generation of exemplary background and target images and a computer simulation of the methods employed by the preprocessor to discriminate targets in terms of gray level sets or modes. A background image characterisitc of terrain features may be generated by overlaying elliptical structured random patterns of pixels on a 48×48 array. In order to make a compact visual presentation, the band of 128 possible gray levels was divided into 16 equal subintervals. A print character was chosen to represent each of these subintervals and this character was output whenever a pixel occurred having a gray level within that particular subinterval. The particular character was chosen on the basis of density, that is, the brightest gray levels are assigned the characters with the highest print density.

Figure 5A:
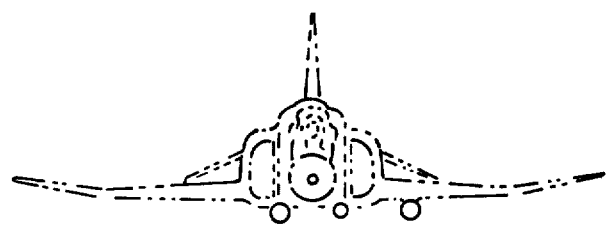
FIGS. 5A, 5B and 5C depict typical simulated Target/Background Imagery.
Figure 5B:
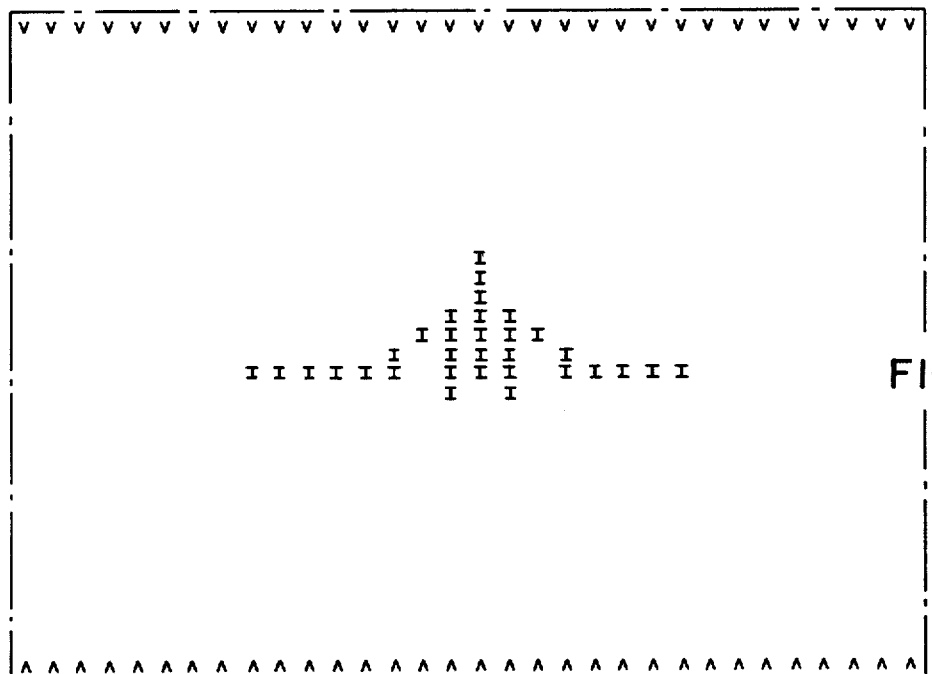
Figure 5C:
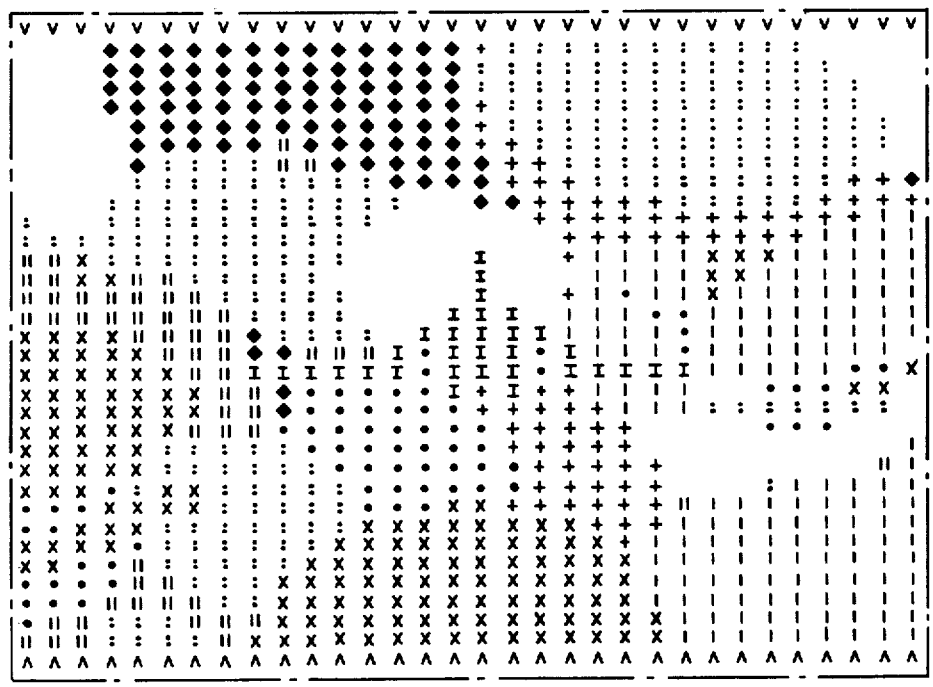

The implementation of the preprocessor is performed on a 32×32 array of pixels extracted from the previously generated background array. By choosing 32×32 arrays with different starting coordinates within the 48×48 array, the background can be made to move across the scene. In the center of this 32×32 array of pixels, an image representative of a silhouette of a possible target is inserted (see FIGS. 5A, 5B, and 5C). FIG. 5C is a composite image upon which the preprocessor may operate.

The operation of the preprocessor and Digital Correlation Tracker (DCT) is simulated for the case of the combination target and background described above. It was observed that when no preprocessing was performed, the DCT is unable to track the target, regardless of the relative gray levels. Next, the preprocessor may be partially implemented. Preprocessing of this image is limited to defining background (B) and target (T) sets. At this point, discrimination of background from target on the basis of relative velocities is not implemented. It is observed that if the intensity of the target mode is greater than the intensity of any background modes left by the preprocessor, the DCT can successfully track the target. If, on the other hand, the intensity of the target mode is less than that of the residual background, tracking fails. For the case of equal gray level, the DCT tracks the set with greatest spatial modulation.

Figure 6A:
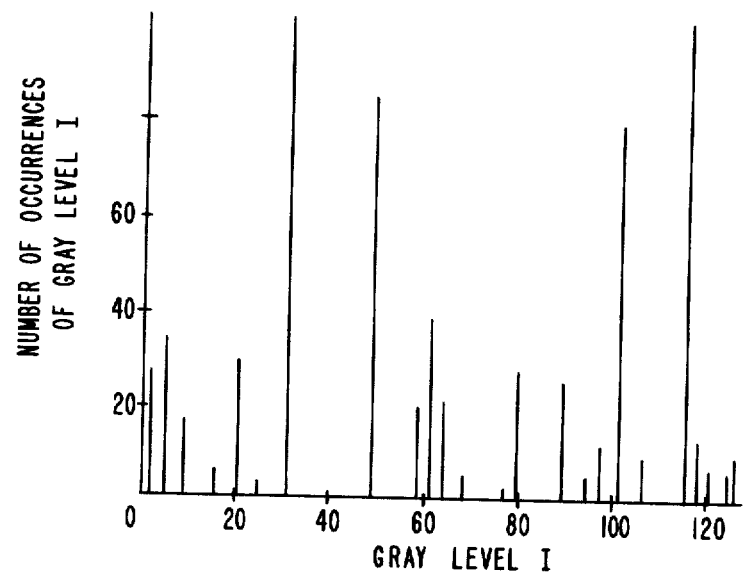
FIGS. 6A, 6B and 6C illustrate typical histograms of mass functions related to simulated well defined Target and Background image intensities.
Figure 6B:
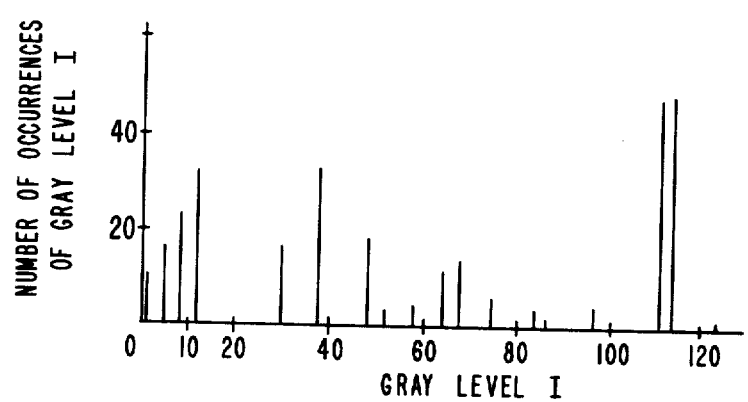
Figure 6C:
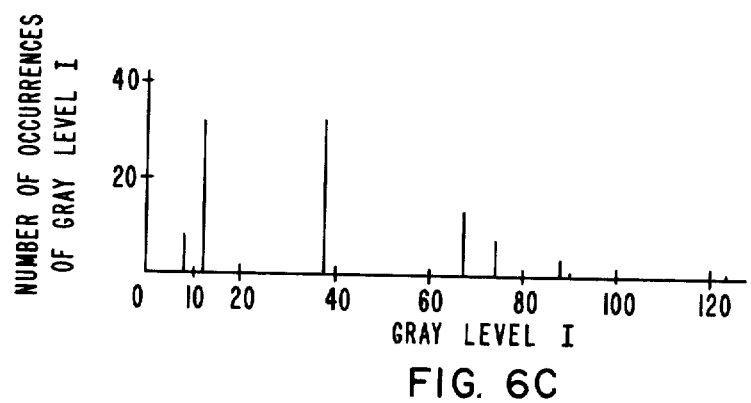
Figure 7A:
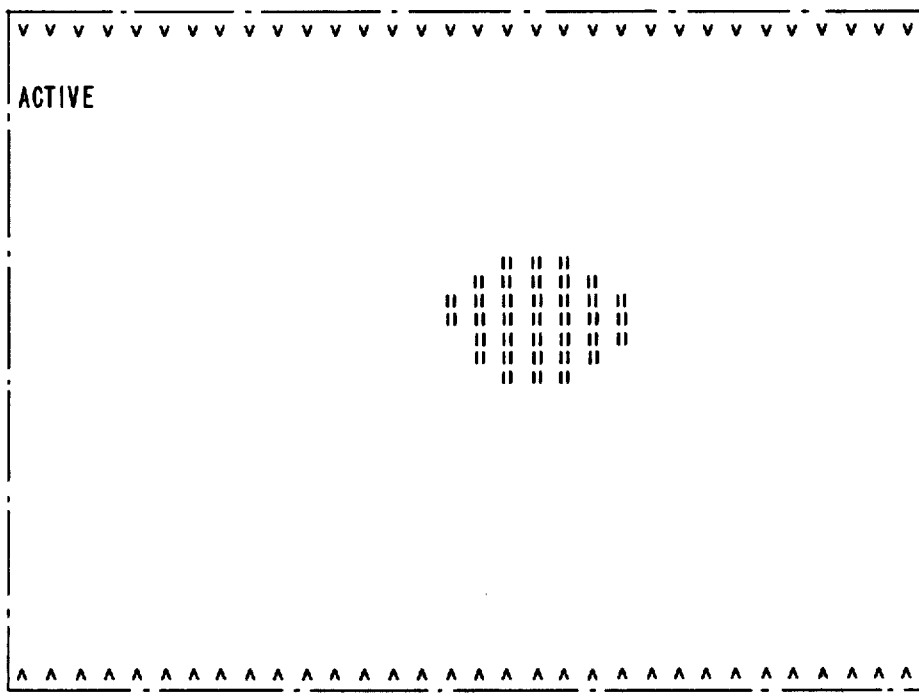
FIGS. 7A and 7B represent active and passive picture patterns, respectively, depicting an example of a video preprocessor in the Acquisition Mode.
Figure 7B:
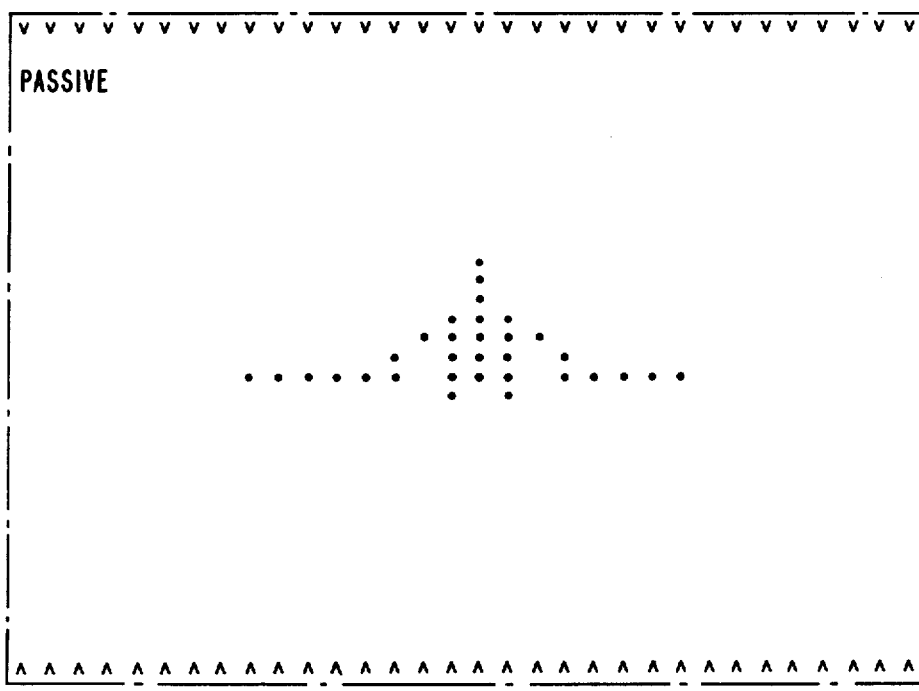
Figure 8A:
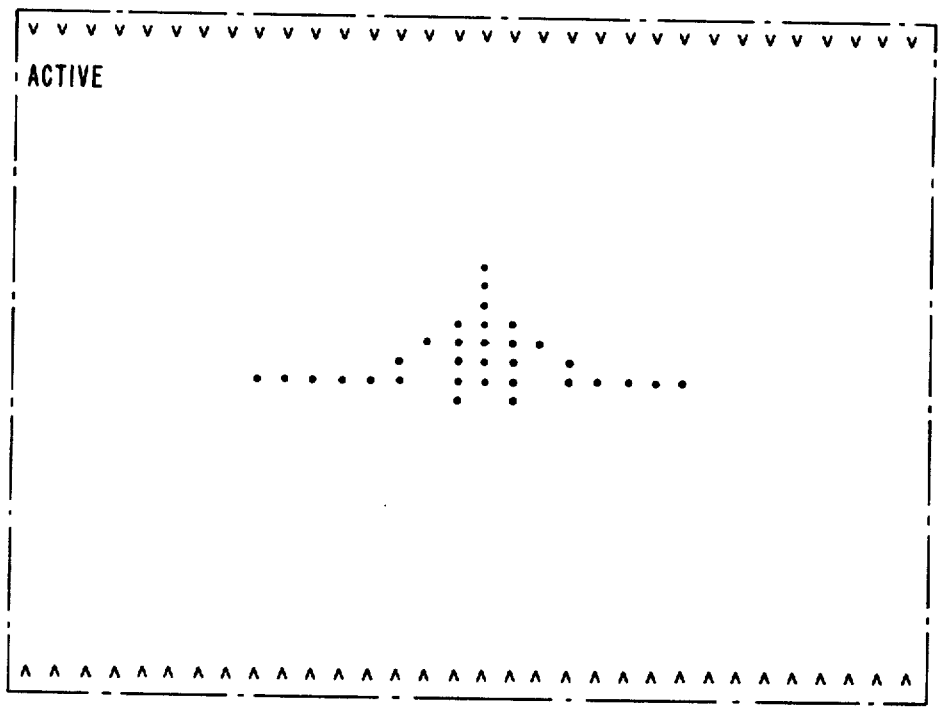
FIGS. 8A and 8B represent active and passive picture patterns, respectively, depicting an example of a video preprocessor in the Enhancement Mode.
Figure 8B:
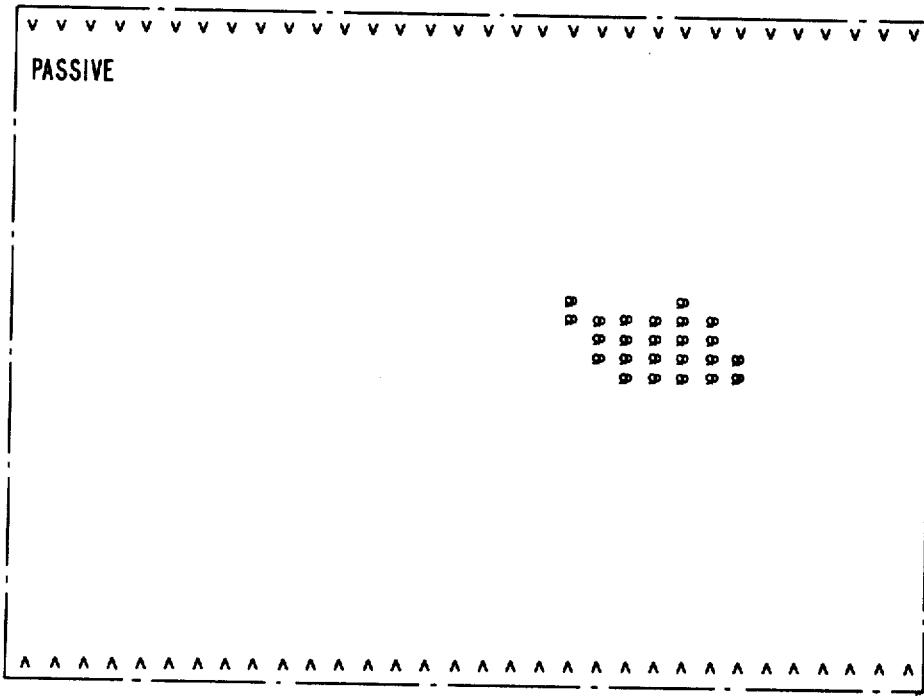
Figure 9A:
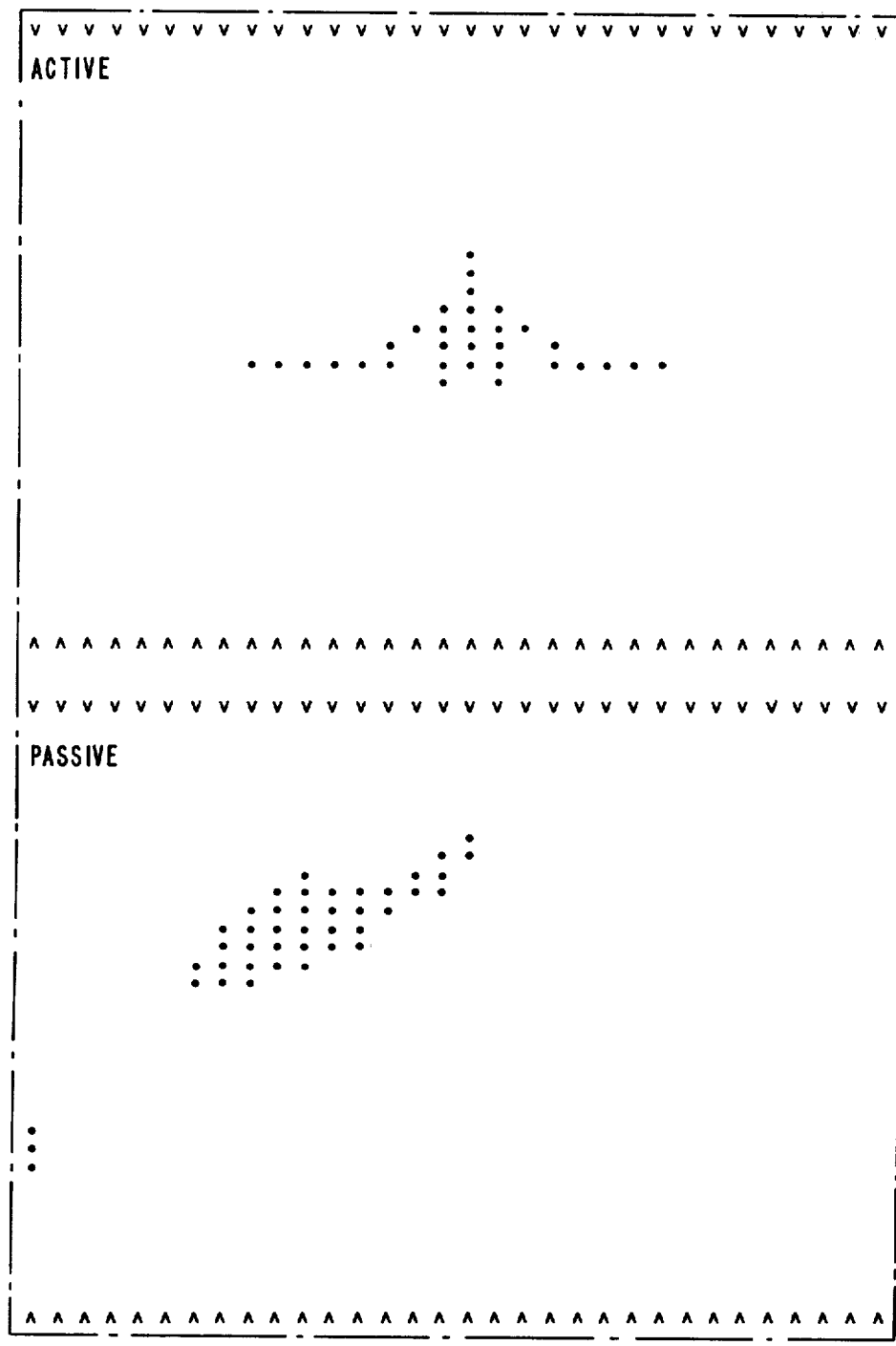
FIGS. 9A and 9B represent examples of active and passive picture patterns of successive imagery video frames illustrating the rejection of background subsets.
Figure 9B:
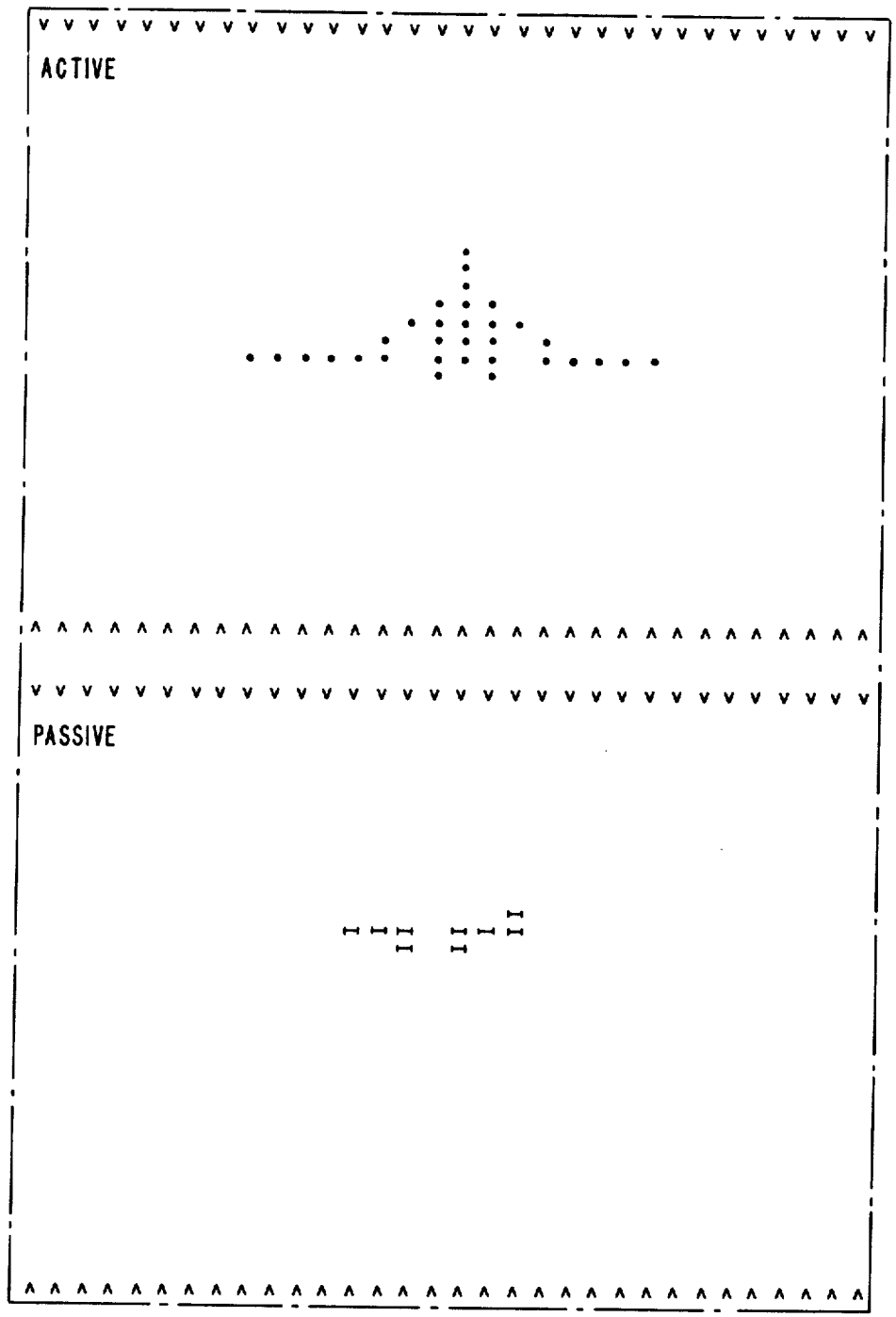
Figure 10:
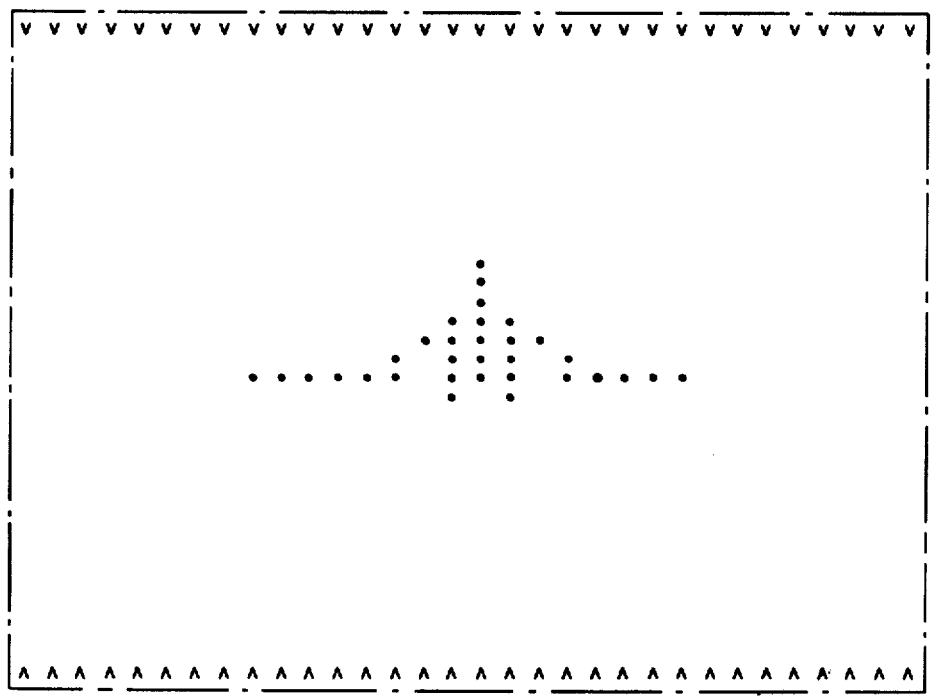
FIG. 10 represents a picture pattern exemplary of a final preprocessed target image.

The extent of the preprocessing may then be expanded to include discrimination between background (B) and target (T) sets on the basis of relative velocities. For the conditions described immediately above, after two frames of video data, it is seen that preprocessor substitutes the target set into the active tracker. After the enhancement process is completed, the DCT tracks the correct target for the duration of the run. FIGS. 6A and 6B are exemplary gray level mass functions of the background and target window sets respectively. FIG. 6C is an example plot of the positive difference function or contrast C of orthogonal gray level subsets which represents the potential target modes. FIGS. 7A and 7B illustrate the subsets being tracked while the preprocessor is in the acquisition mode; the FIG. 7A represents a picture of the active tracker following a background set while FIG. 7B represents a picture of the passive tracker following the target set. Note that the target subset is not the largest subset within the track window in this example. FIGS. 8A and 8B represent pictures of the active and passive trackers respectively, for the next frame of the sequence. A moving target has been detected and operation is shifted to the enhancement mode. Note that the active tracker shown in FIG. 8A is now tracking the correct target set. The preprocessor is now operating in the enhancement mode. FIGS. 9A and 9B represent picture patterns portraying the rejection of subsequent background sets from the image in accordance with the enhancement process. FIG. 10 represents a picture pattern of the image utilized by the DCT after the preprocessor has rejected all of the residual subsets.

Although what is presented above is a simplified simulation of a preprocessor implementation, it is felt adequate in illustrating the operation of the preprocessor in conjunction with a video tracking system such as a digital correlation tracker. Other more sophisticated examples may have been presented, but these were not considered beneficial to the understanding of the basic invention.

We claim:

1. Apparatus for preprocessing the video content of video frame signals generated sequentially by an electro-optical sensor for discriminating a target image therefrom, comprising:

means for selecting a predetermined portion of video signal from each video frame signal;

means for dividing the selected predetermined portion of each video frame signal into a predetermined number of elements, said elements being indexed in accordance with their corresponding time dependent positions within the predetermined portion of video signal;

means for assigning to each element a gray level value selected from a plurality of discrete gray level values as a measure of the video content thereof;

means for segregating the elements of the predetermined portion of a selected video frame signal into inner and outer portions with respect to their time dependent position index;

means for classifying the elements of the outer portion as a function of their assigned gray level values;

means for classifying the elements of the inner portion as a function of their gray level values;

means for generating a discriminant function of gray level values based on the gray level classification of elements of the inner and outer portions;

means for selecting from the selected predetermined portion of each video frame signal only those elements having assigned gray level values corresponding to that of the discriminant function generated from the selected video frame signal; and means for replacing the video content of the selected predetermined portion of each video frame signal with only the video content of the elements selected therefrom corresponding to the indexed position thereof, whereby the composition of the selected elements represents, at times, a substantial image of the target within the predetermined portion of each video frame signal.

2. Apparatus as recited in claim 1 wherein:

the elements of the inner portion are classified according to the plurality of gray level values wherein each gray level value has associated therewith an inner mass intensity number representative of the number of elements within the inner portion which are commonly assigned to a gray level value;

the elements of the outer portion are classified according to the plurality of gray level values wherein each gray level value has associated therewith an outer mass intensity number representative of the number of elements within the outer portion which are commonly assigned to a gray level value; and the discriminant function is generated by subtracting the outer mass intensity numbers from the inner mass intensity numbers which are respectively associated to common gray level values and selecting only those gray level values which have a positive difference intensity number greater than a predetermined threshold value.

3. Apparatus as recited in claim 2 wherein the elements which are selected from the selected predetermined portion of each video frame signal have assigned gray level values corresponding to the selected gray level values of the discriminant function.

4. Apparatus as recited in claim 1 wherein the plurality of discrete gray level values comprise a video content spectrum divided into a predetermined number of consecutive gray level values.

5. Apparatus for preprocessing the video content of video frame signals generated sequentially by an electro-optical sensor for discriminating a target image therefrom, comprising:

means for selecting a predetermined portion of video signal from the video frame signals;

means for dividing the selected predetermined portion of the video frame signal into a predetermined number of elements, said elements being indexed in accordance with their corresponding time dependent positions within the predetermined portion of video signal;

means for assigning each element to a gray level value selected from a plurality of discrete gray level values as a measure of the video content thereof;

means for categorizing the plurality of discrete gray level values into modes of gray level values based on the number of elements assigned to each gray level value for a selected video frame signal;

means for generating a signal representative of the velocity of the elements having gray level values corresponding to the gray level values of at least one mode;

means for identifying at least one mode of gray level values as being representative of a target set of modes based on a relationship of the generated velocity signals of the modes and a predetermined velocity signal; and means for replacing the video content of the selected predetermined portion of the video frame signals with only the video content of the elements having gray level values corresponding to the gray level values of the identified target set of modes, said elements being replaced corresponding to their indexed position in the video frame signal, whereby the composition of the elements of the identified target set of modes provide an intensity pattern which represents an image of at least a portion of the target within the predetermined portion of the video frame signals.

6. Apparatus for preprocessing the video content of video frame signals generated sequentially by an electro-optical sensor for discriminating a target image therefrom, comprising:

means for selecting a predetermined portion of video signal from the video frame signals;

means for dividing the selected predetermined portion of the video frame signal into a predetermined number of elements, said elements being indexed in accordance with their corresponding time dependent positions within the predetermined portion of video signal;

means for assigning each element to a gray level value selected from a plurality of discrete gray level values as a measure of the video content thereof;

means for categorizing the plurality of discrete gray level values into modes of gray level values based on the number of elements assigned to each gray level value for a selected video frame signal;

means for isolating elements having assigned gray level values corresponding to a first mode of gray level values from the predetermined portion of the video frame signals;

means for isolating elements having assigned gray level values corresponding to a second mode of gray level values from the predetermined portion of the video frame signal;

means for generating signals representative of the velocity of the isolated elements of the first mode of gray level values and the isolated elements of the second mode of gray level values;

means for identifying at least one mode from the first and second modes based on the generated velocity signals of the first and second modes and, at times, a predetermined velocity signal;

means for indexing the gray level values of the at least one identified mode as the first mode and the gray level values of another mode of the set of modes as the second mode; and means for replacing the video content of the selected predetermined portion of the video frame signals with only the video content of the elements having gray level values corresponding to the gray level values of the first mode, said elements being replaced corresponding to their indexed position in the video frame signal, whereby the composition of the elements of the first mode provide an intensity pattern which represents an image of at least a portion of the target within the predetermined portion of the video frame signal.

7. Apparatus as recited in claim 6 wherein the categorizing means includes:
  means for segregating the elements of the predetermined portion of a selected video frame signal into inner and outer portions with respect to their time dependent position index;
  means for classifying the elements of the inner portion according to the plurality of discrete gray level values, each gray level value has associated therewith an inner mass intensity number representative of the number of elements within the inner portion which are commonly assigned to a gray level value;
  means for classifying the elements of the outer portion according to the plurality of discrete gray level values, each gray level value has associated therewith an outer mass intensity number representative of the number of elements within the outer portion which are commonly assigned to a gray level value;
  means for generating a discriminant function by subtracting the outer mass intensity numbers from the inner mass intensity numbers which are respectively associated to common gray level values and selecting only those gray level values which have a positive difference intensity number greater than a predetermined threshold value; and
  means for grouping the selected gray level values of the discriminant function into a set of modes.

8. Apparatus as recited in claim 7 wherein the plurality of discrete gray level values comprise a video content spectrum divided into a predetermined number of consecutive integer gray level values.

9. Apparatus as recited in claim 8 wherein the set of modes are groupings of the selected integer gray level values of the discriminant function which are consecutively continuous.

10. A method of preprocessing the video content of video frame signals generated sequentially by an electro-optical sensor for discriminating a target image therefrom, comprising the steps of:
  selecting a predetermined portion of video signal from each video frame signal;
  dividing the selected predetermined portion of each video frame signal into a predetermined number of elements and indexing each element in accordance with its corresponding time dependent position within the predetermined portion of video signal;
  assigning to each element a gray level value selected from a plurality of discrete gray level values as a measure of the video content thereof;
  segregating the elements of the predetermined portion of a selected video frame signal into inner and outer portions with respect to their time dependent position index;
  classifying the elements of the outer portion as a function of their assigned gray level values;
  classifying the elements of the inner portion as a function of their gray level values;
  generating a discriminant function of gray level values based on the gray level classification of elements of the inner and outer portions;
  selecting from the selected predetermined portion of each video frame signal only those elements having assigned gray level values corresponding to the gray levels of the discriminant function generated from the selected video frame signal; and
  replacing the video content of the selected predetermined portion of each video frame signal with only the video content of the elements selected therefrom corresponding to the indexed position thereof, whereby the composition of the selected elements represents, at times, a substantial image of the target within the predetermined portion of each video frame signal.

11. The method as recited in claim 10 wherein:
  the elements of the inner portion are classified according to the plurality of gray level values wherein each gray level value has associated therewith an inner mass intensity number representative of the number of elements within the inner portion which are commonly assigned to a gray level value;
  the elements of the outer portion are classified according to the plurality of gray level values wherein each gray level value has associated therewith an outer mass intensity number representative of the number of elements within the outer portion which are commonly assigned to a gray level value; and
  the discriminant function is generated by subtracting the outer mass intensity numbers from the inner mass intensity numbers which are respectively associated to common gray level values and selecting only those gray level values which have a positive difference intensity number greater than a predetermined threshold value.

12. The method as recited in claim 11 wherein the selecting of elements from the selected predetermined portion of each video frame signal is based on only those elements which have assigned gray level values corresponding to the selected gray level values of the discriminant function.

13. The method as recited in claim 10 wherein the plurality of discrete gray level values are divided into a predetermined number of consecutive integer gray level values.

14. A method of preprocessing the video content of video frame signals generated sequentially by an electro-optical sensor for discriminating a target image therefrom, comprising the steps of:
  selecting a predetermined portion of video signal from the video frame signals;
  dividing the selected predetermined portion of the video frame signal into a predetermined number of elements and indexing each element in accordance with its corresponding time dependent position within the predetermined portion of video signal;
  assigning each element to a gray level value selected from a plurality of discrete gray level values as a measure of the video content thereof;
  categorizing the plurality of discrete gray level values into modes of gray level values based on the number of elements assigned to each gray level value for a selected video frame signal;

generating a signal representative of the velocity of the elements having gray level values corresponding to the gray level values of at least one mode;

identifying at least one mode of gray level values as being representative of a target set of modes based on a relationship of the generated velocity signals of the modes and a predetermined velocity signal; and replacing the video content of the selected predetermined portion of the video frame signals with only the video content of the elements having gray level values corresponding to the gray level values of the identified target set of modes, said elements being replaced corresponding to their indexed position in the video frame signal, whereby the composition of the elements of the identified target set of modes provide an intensity pattern which represents an image of at least a portion of the target within the predetermined portion of the video frame signals.

15. A method of preprocessing the video content of video frame signals generated sequentially by an electro-optical sensor for discriminating a target image therefrom, comprising the steps of:

selecting a predetermined portion of video signal from the video frame signals;

dividing the selected predetermined portion of the video frame signal into a predetermined number of elements and indexing each element in accordance with its corresponding time dependent position within the predetermined portion of video signal;

assigning each element to a gray level value selected from a plurality of discrete gray level values as a measure of the video content thereof;

categorizing the plurality of discrete gray level values into modes of gray level values based on the number of elements assigned to each gray level value for an initial video frame signal;

isolating elements having assigned gray level values corresponding to a first mode of gray level values from the predetermined portion of the video frame signals;

isolating elements having assigned gray level values corresponding to a second mode of gray level values from the predetermined portion of the video frame signal;

generating signals representative of the velocity of the isolated elements of the first mode of gray level values and the isolated elements of the second mode of gray level values;

selecting at least one mode from the first and second modes based on the generated velocity signals of the first and second modes and, at times, a predetermined velocity signal;

indexing the gray level values of the at least one selected mode as the first mode and indexing the gray level values of another mode of the set of modes as the second mode; and replacing the video content of the selected predetermined portion of the video frame signals with only the video content of the elements having gray level values corresponding to the gray level values of the first mode, said elements being replaced corresponding to their indexed position in the video frame signal, whereby the composition of the elements of the first mode provide an intensity pattern which represents an image of at least a portion of the target within the predetermined portion of the video frame signal.

16. The method as recited in claim 15 wherein the step of categorizing further includes the steps of:

segregating the elements of the predetermined portion of a selected video frame signal into inner and outer portions with respect to their time dependent position index;

classifying the elements of the inner portion according to their assigned gray level values and assigning to each gray level value an inner mass intensity member which is representative of the number of elements classified thereto;

classifying the elements of the outer portion according to their assigned gray level values and assigning to each gray level value at outer mass intensity number which is representative of the number of elements classified thereto;

generating a discriminant function by subtracting the outer mass intensity numbers from the inner mass intensity numbers which are assigned to common gray level values and selecting only those gray level values which have a positive difference intensity number greater than a predetermined threshold value; and grouping the selected gray level values of the discriminant function into a set of modes.

17. The method as recited in claim 16 wherein the plurality of discrete gray level values are divided into a predetermined number of consecutive integer gray level values.

18. The method as recited in claim 17 wherein the selected gray level values of the discriminant function are grouped into bands of only continuously consecutive gray level values.

19. The method of preprocessing the video content of video frame signals generated sequentially by an electro-optical sensor for discriminating a target image therefrom comprising the steps of:

(a) selecting a predetermined portion of video signal from the video frame signals;

(b) dividing the selected predetermined portion of the video frame signals into elements and indexing each element in accordance with its time dependent position within the predetermined position of the video signal;

(c) assigning to each element a gray level value selected from a plurality of discrete gray level values as a measure of video content thereof;

(d) forming a discriminant function of discrete gray level values based on the number of elements assigned to each gray level value for an initial video frame signal;

(e) categorizing the gray level values of the discriminant function into a predetermined number of modes;

(f) selecting only the elements of an instant video frame signal subsequent to the initial video frame signal which have assigned gray level values corresponding to the gray level values of the formed discriminant function;

(g) isolating only the elements selected from the instant video frame signal which have assigned gray level values corresponding to the gray level values of a first mode of the categorized predetermined number of modes;

(h) generating a signal representative of the velocity of the isolated elements of step (g);

(i) isolating only the elements selected from the instant video frame signal which have assigned gray level values corresponding to the gray level values of a second mode of the categorized predetermined number of modes;

(j) generating a signal representative of the velocity of the isolated elements of step (i);

(k) selecting at least one mode from the first and second modes based on the generated velocity signals of the first and second modes and, at times, a predetermined velocity signal;

(l) thereafter, indexing the gray level values of the at least one selected mode as the first mode and indexing the gray level values of another mode of the predetermined number of modes which has not been previously used for isolating elements in steps (g) and (i) as the second mode;

(m) thereafter, replacing the video content of the selected predetermined portion of the instant video frame signal with only the video content of the element having gray level values corresponding to the gray level values of the first mode, said elements being replaced corresponding to their indexed position in the instant video frame signal;

(n) repeat steps (f) through (m) sequentially for a predetermined number of instant video frame signals subsequent to the initial video frame signal; and (o) thereafter, repeat steps (f), (g), (h) and (m) sequentially.

20. The method of claim 19 wherein the selected predetermined portion of the video frame signals is divided into a 32×32 element array.

21. The method of claim 19 wherein each element is assigned an integer gray level value selected from 129 consecutive integer gray level values as a measure of the video content thereof.

22. The method of claim 19 wherein the steps (f) through (m) are sequentially repeated until the predetermined number of modes categorized by step (e) have been indexed by step (l).

23. The method of claim 19 further comprising the step of ranking the predetermined number of modes in accordance to the number of elements associated with the gray levels of each mode categorized for the initial video frame signal; wherein the mode ranked as having the largest mass of elements is initially indexed as the first mode and the mode ranked as having the next-to-the-largest mass of elements is initially indexed as the second mode; and wherein the remaining modes of the predetermined number of modes are indexed in step (l) sequentially starting with the largest element mass mode and exhausting with the smallest element mass mode.

24. The method of claim 23 wherein steps (f) through (m) are repeated for each video frame until the predetermined number of modes are exhausted.

* * * * *